US012652368B2

(12) United States Patent
Yang et al.

(10) Patent No.: US 12,652,368 B2
(45) Date of Patent: Jun. 9, 2026

(54) VIDEO CALL METHOD AND RELATED DEVICE

(71) Applicant: HUAWEI TECHNOLOGIES CO., LTD., Shenzhen (CN)

(72) Inventors: Yagang Yang, Xi'an (CN); Xingong Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 325 days.

(21) Appl. No.: 18/264,911

(22) PCT Filed: Dec. 17, 2021

(86) PCT No.: PCT/CN2021/139328
§ 371 (c)(1),
(2) Date: Aug. 9, 2023

(87) PCT Pub. No.: WO2022/170854
PCT Pub. Date: Aug. 18, 2022

(65) Prior Publication Data
US 2024/0114110 A1 Apr. 4, 2024

(30) Foreign Application Priority Data

Feb. 9, 2021 (CN) .......................... 202110182932.2

(51) Int. Cl.
*H04N 7/14* (2006.01)
*G06F 11/22* (2006.01)
(52) U.S. Cl.
CPC ......... *H04N 7/141* (2013.01); *G06F 11/2221* (2013.01)

(58) Field of Classification Search
CPC ....... H04N 7/141; H04N 7/14; G06F 11/2221
See application file for complete search history.

(56) References Cited

U.S. PATENT DOCUMENTS

| 8,896,651 B2 * | 11/2014 | Chu | H04L 65/403 |
| | | | 348/14.05 |
| 11,032,334 B2 * | 6/2021 | Lu | H04W 76/34 |
| 2005/0219370 A1 | 10/2005 | Liao | |

(Continued)

FOREIGN PATENT DOCUMENTS

| CN | 101674407 A | 3/2010 |
| CN | 103873101 A | 6/2014 |

(Continued)

*Primary Examiner* — Olisa Anwah
(74) *Attorney, Agent, or Firm* — Leydig, Voit & Mayer, Ltd.

(57) ABSTRACT

The method includes: a first electronic device obtains a video call task request sent by a third electronic device; the first electronic device detects that the first electronic device is currently configured with no camera; the first electronic device establishes a voice call task with the third electronic device; the first electronic device sends a probe frame to an external camera; a communication module in the external camera is powered on in a process in which the external camera approaches the first electronic device; the external camera obtains the probe frame; the external camera sends a response frame to the first electronic device; and the first electronic device switches the voice call task to a video call task.

20 Claims, 10 Drawing Sheets

(56)         References Cited

U.S. PATENT DOCUMENTS

| | | | | |
|---|---|---|---|---|
| 2010/0188473 | A1* | 7/2010 | King | H04M 3/56 |
| | | | | 348/E7.083 |
| 2013/0142056 | A1* | 6/2013 | Abplanalp | H04L 41/02 |
| | | | | 370/254 |
| 2014/0211666 | A1* | 7/2014 | Gillett | H04L 65/1069 |
| | | | | 370/259 |
| 2015/0304604 | A1 | 10/2015 | Sharma | |
| 2015/0363165 | A1* | 12/2015 | Zhou | H04M 1/271 |
| | | | | 715/728 |
| 2017/0280494 | A1 | 9/2017 | Jung et al. | |
| 2020/0204599 | A1* | 6/2020 | Ravichandran | H04L 65/1104 |

FOREIGN PATENT DOCUMENTS

| | | | |
|---|---|---|---|
| CN | 103997595 | A | 8/2014 |
| CN | 108391101 | A | 8/2018 |
| CN | 207764570 | U | 8/2018 |
| CN | 111526289 | A | 8/2020 |
| EP | 2723108 | A2 | 4/2014 |
| WO | 2012115253 | A1 | 8/2012 |

* cited by examiner

VIDEO CALL METHOD AND RELATED DEVICE

CROSS REFERENCE TO RELATED APPLICATIONS

This application is a national stage of International Application No. PCT/CN2021/139328, filed on Dec. 17, 2021, which claims priority to Chinese Patent Application No. 202110182932.2 filed on Feb. 9, 2021. Both of the aforementioned applications are hereby incorporated by reference in their entireties.

TECHNICAL FIELD

Embodiments of this application relate to the field of terminals, and more specifically, to a video call method and a related device in the field of terminals.

BACKGROUND

For some electronic devices that are configured with no camera, for example, large-screen display devices, when a camera function of such an electronic device needs to be used, an electronic device that can provide the camera function may be secured to the electronic device. For example, the electronic device that can provide the camera function is a camera.

To protect privacy, when the camera function does not need to be used, a user usually removes the electronic device that can provide the camera function from the electronic device that is configured with no camera. When the camera function needs to be used again, the user secures the electronic device to the electronic device that is configured with no camera. Then, the electronic device that is configured with no camera starts to supply power to the electronic device. The electronic device can start to be enabled only after being supplied with power. When the two electronic devices are separated from each other, if an application on another electronic device sends a video call request to an application on the electronic device that is configured with no camera, the video call request can be established only after the camera is connected to the electronic device and completely enabled. However, it takes about several seconds to connect the camera to the electronic device and enable the camera. The video call request cannot be established in this period. As a result, waiting time of users in a video call is prolonged, affecting user experience.

SUMMARY

Embodiments of this application provide a video call method and a related device, so that waiting time of users in making and answering a video call can be shortened.

According to a first aspect, a method for establishing a video call task is provided. The method includes: A first electronic device obtains a video call task request sent by a third electronic device; the first electronic device detects that the first electronic device is currently configured with no camera; the first electronic device establishes a voice call task with the third electronic device; the first electronic device sends a probe frame to an external camera, where the external camera is in a state in which no connection is established to the first electronic device; a communication module in the external camera is powered on in a process in which the external camera approaches the first electronic device; the external camera obtains the probe frame; the external camera sends a response frame to the first electronic device, where the response frame is a reply to the probe frame; and the first electronic device switches the voice call task to a video call task, where the video call task is a video call task between the first electronic device and the third electronic device.

Based on the foregoing technical solution, in a case that the first electronic device is configured with no camera, the first electronic device first establishes the voice call task with the third electronic device, so that users may first make and answer a voice call. After the first electronic device receives the response frame, the first electronic device determines that the external camera is approaching the first electronic device. At this time, the first electronic device switches the voice call task to the video call task, so that the users can make and answer the video call when the external camera is plugged into the first electronic device, thereby shortening waiting time of the users in making and answering a video call.

With reference to the first aspect, in some implementations of the first aspect, after the external camera obtains the probe frame, the method further includes: starting to enable a camera module in the external camera.

With reference to the first aspect, in some implementations of the first aspect, the method further includes: The external camera establishes an electrical connection to the first electronic device after the external camera is plugged into an interface of the first electronic device; the external camera sends a video stream to the first electronic device; and the first electronic device sends the video stream to the third electronic device by using the video call task.

With reference to the first aspect and the foregoing implementations of the first aspect, in some implementations of the first aspect, before the first electronic device switches the voice call task to the video call task, the method further includes: The first electronic device obtains a parameter of the external camera and a parameter of the third electronic device; the first electronic device determines a first video call parameter based on the parameter of the external camera and the parameter of the third electronic device; the first electronic device sends the first video call parameter to the external camera; and the first electronic device establishes a data transmission channel with the external camera.

Based on the foregoing technical solution, in the process in which the external camera approaches the first electronic device, by obtaining the parameter of the external camera in a short-distance mode, the first electronic device determines the first video call parameter of the external camera based on the parameter of the external camera and the parameter of the third electronic device, and delivers the first video call parameter in the short-distance mode to the external camera, so that the first video call parameter has been delivered in the short-distance mode to the external camera before or during enabling of the camera module in the external camera. Compared with a method of negotiating and delivering a first video call parameter after an external camera establishes a connection to a large-screen display device, the video call method provided in this application can shorten waiting time of users in a video call.

With reference to the first aspect and the foregoing implementations of the first aspect, in some implementations of the first aspect, a parameter of the video stream is the first video call parameter of the external camera.

With reference to the first aspect and the foregoing implementations of the first aspect, in some implementations of the first aspect, that the first electronic device obtains a parameter of the external camera includes: The first electronic device sends a first request message to the communication module in the external camera; and the communication module in the external camera sends a first response message to the first electronic device, where the first response message carries the parameter of the external camera.

With reference to the first aspect and the foregoing implementations of the first aspect, in some implementations of the first aspect, the video call task request carries the parameter of the third electronic device.

With reference to the first aspect and the foregoing implementations of the first aspect, in some implementations of the first aspect, the starting to enable a camera module in the external camera includes: conducting, by the communication module in the external camera, a circuit between a power supply module in the external camera and the camera module in the external camera by using an enable signal; and starting to enable the camera module in the external camera.

Based on the foregoing technical solution, in the process in which the external camera approaches the first electronic device, the communication module in the external camera conducts the circuit between the power supply module in the external camera and the camera module in the external camera by using the enable signal, and the camera module in the external camera runs after the camera module in the external camera is powered on, so that the camera module in the external camera starts to be enabled in the process in which the external camera approaches the first electronic device.

With reference to the first aspect and the foregoing implementations of the first aspect, in some implementations of the first aspect, before the first electronic device establishes the voice call task, the method further includes: The first electronic device displays an answer interface of a voice call. That the first electronic device establishes a voice call task includes: The first electronic device detects a first operation on the answer interface of the voice call, and the first electronic device establishes the voice call task in response to the first operation.

Based on the foregoing technical solution, the first electronic device displays the answer interface of the voice call to a user, so that in cases that the first electronic device is configured with no camera and that the first operation on the answer interface of the voice call is detected, the first electronic device first establishes the voice call task with the third electronic device, thereby enabling the users to first make and answer a voice call. This improves user experience.

With reference to the first aspect and the foregoing implementations of the first aspect, in some implementations of the first aspect, before the external camera sends the video stream to the first electronic device, the method further includes: The first electronic device sends a heartbeat message to the external camera; and the external camera sends a third response message to the first electronic device, where the third response message indicates that the external camera has successfully established the electrical connection to the first electronic device.

Based on the foregoing technical solution, the first electronic device sends the heartbeat message; after the external camera receives the heartbeat message, the external camera may determine that the external camera has successfully established the connection to the first electronic device; then, the external camera sends the third response message to the first electronic device; and the first electronic device may determine, based on the third response message, that the first electronic device has successfully established the connection to the external camera.

According to a second aspect, a video call method is provided. The method is executed by an external camera. The external camera is in a state in which no connection is established to a first electronic device. The method includes: A communication module in the external camera is powered on in a process in which the external camera approaches the first electronic device; the external camera obtains a probe frame; and the external camera sends a response frame to the first electronic device, where the response frame is a reply to the probe frame.

Based on the foregoing technical solution, in a case that the first electronic device is configured with no camera, the first electronic device first establishes a voice call task with a third electronic device, so that users may first make and answer a voice call. After the first electronic device receives the response frame, the first electronic device determines that the external camera is approaching the first electronic device. At this time, the first electronic device switches the voice call task to a video call task, so that the users can make and answer a video call when the external camera is plugged into the first electronic device, thereby shortening waiting time of the users in making and answering a video call.

With reference to the second aspect, in some implementations of the second aspect, after the external camera obtains the probe frame, the method further includes: starting to enable a camera module in the external camera.

With reference to the second aspect, in some implementations of the second aspect, the method further includes: The external camera establishes an electrical connection to the first electronic device after the external camera is plugged into an interface of the first electronic device; and the external camera sends a video stream to the first electronic device.

With reference to the second aspect and the foregoing implementations of the second aspect, in some implementations of the second aspect, the method further includes: The external camera receives a first video call parameter sent by the first electronic device.

Based on the foregoing technical solution, in the process in which the external camera approaches the first electronic device, by obtaining a parameter of the external camera in a short-distance mode, the first electronic device determines the first video call parameter of the external camera based on the parameter of the external camera and a parameter of the third electronic device, and delivers the first video call parameter in the short-distance mode to the external camera, so that the first video call parameter has been delivered in the short-distance mode to the external camera before or during enabling of the camera module in the external camera. Compared with a method of negotiating and delivering a first video call parameter after an external camera establishes a connection to a large-screen display device, the video call method provided in this application can shorten waiting time of users in a video call.

With reference to the second aspect and the foregoing implementations of the second aspect, in some implementations of the second aspect, a parameter of the video stream is the first video call parameter of the external camera.

With reference to the second aspect and the foregoing implementations of the second aspect, in some implementations of the second aspect, before the external camera receives the first video call parameter sent by the first electronic device, the method further includes: The communication module in the external camera receives a first request message sent by the first electronic device; and the communication module in the external camera sends a first response message to the first electronic device, where the first response message carries the parameter of the external camera.

With reference to the second aspect and the foregoing implementations of the second aspect, in some implementations of the second aspect, the starting to enable a camera module in the external camera includes: conducting, by the communication module in the external camera, a circuit between a power supply module in the external camera and the camera module in the external camera by using an enable signal; and starting to enable the camera module in the external camera.

Based on the foregoing technical solution, in the process in which the external camera approaches the first electronic device, the communication module in the external camera conducts the circuit between the power supply module in the external camera and the camera module in the external camera by using the enable signal, and the camera module in the external camera runs after the camera module in the external camera is powered on, so that the camera module in the external camera starts to be enabled in the process in which the external camera approaches the first electronic device.

With reference to the second aspect and the foregoing implementations of the second aspect, in some implementations of the second aspect, before the external camera sends the video stream to the first electronic device, the method further includes: The external camera receives a heartbeat message sent by the first electronic device; and the external camera sends a third response message to the first electronic device, where the third response message indicates that the external camera has successfully established the electrical connection to the first electronic device.

Based on the foregoing technical solution, the first electronic device sends the heartbeat message; after the external camera receives the heartbeat message, the external camera may determine that the external camera has successfully established the connection to the first electronic device; then, the external camera sends the third response message to the first electronic device; and the first electronic device may determine, based on the third response message, that the first electronic device has successfully established the connection to the external camera.

According to a third aspect, this application provides an apparatus. The apparatus is included in an electronic device, and the apparatus has a function of implementing behavior of the electronic device in the foregoing aspects and the possible implementations of the foregoing aspects. The function may be implemented by hardware, or may be implemented by executing corresponding software by hardware. The hardware or the software includes one or more modules or units corresponding to the foregoing function.

According to a fourth aspect, this application provides an electronic device, including a touchscreen. The touchscreen includes a touch-sensitive surface, a display, a camera, one or more processors, a memory, a plurality of applications, and one or more computer programs. The one or more computer programs are stored in the memory. The one or more computer programs include instructions. When the instructions are executed by the electronic device, the electronic device is enabled to perform the method according to any possible implementation of any one of the foregoing aspects.

According to a fifth aspect, this application provides an electronic device, including one or more processors and one or more memories. The one or more memories are coupled to the one or more processors. The one or more memories are configured to store computer program code. The computer program code includes computer instructions. When the one or more processors execute the computer instructions, the electronic device is enabled to perform the method according to any possible implementation of any one of the foregoing aspects.

According to a sixth aspect, this application provides a computer-readable storage medium, including computer instructions. When the computer instructions are run on an electronic device, the electronic device is enabled to perform the method according to any possible implementation of any one of the foregoing aspects.

According to a seventh aspect, this application provides a computer program product. When the computer program product is run on an electronic device, the electronic device is enabled to perform the method according to any possible implementation of any one of the foregoing aspects.

DESCRIPTION OF EMBODIMENTS

The following describes technical solutions in embodiments of this application with reference to accompanying drawings in the embodiments of this application.

Generally, when a user needs to use a camera function on a first electronic device that is configured with no camera, a second electronic device that can provide the camera function for the first electronic device needs to be secured to the first electronic device. For example, the user may secure the second electronic device to the first electronic device by using a pogo pin.

The first electronic device in this embodiment of this application may be an electronic device that can implement a display function, for example, a large-screen display device, a tablet computer, a wearable device, a vehicle-mounted device, an augmented reality (AR)/virtual reality (VR) device, a notebook computer, an ultra-mobile personal computer (UMPC), a netbook, or a personal digital assistant (PDA). A specific type of the first electronic device is not limited in this embodiment of this application.

Figures 1, 2:
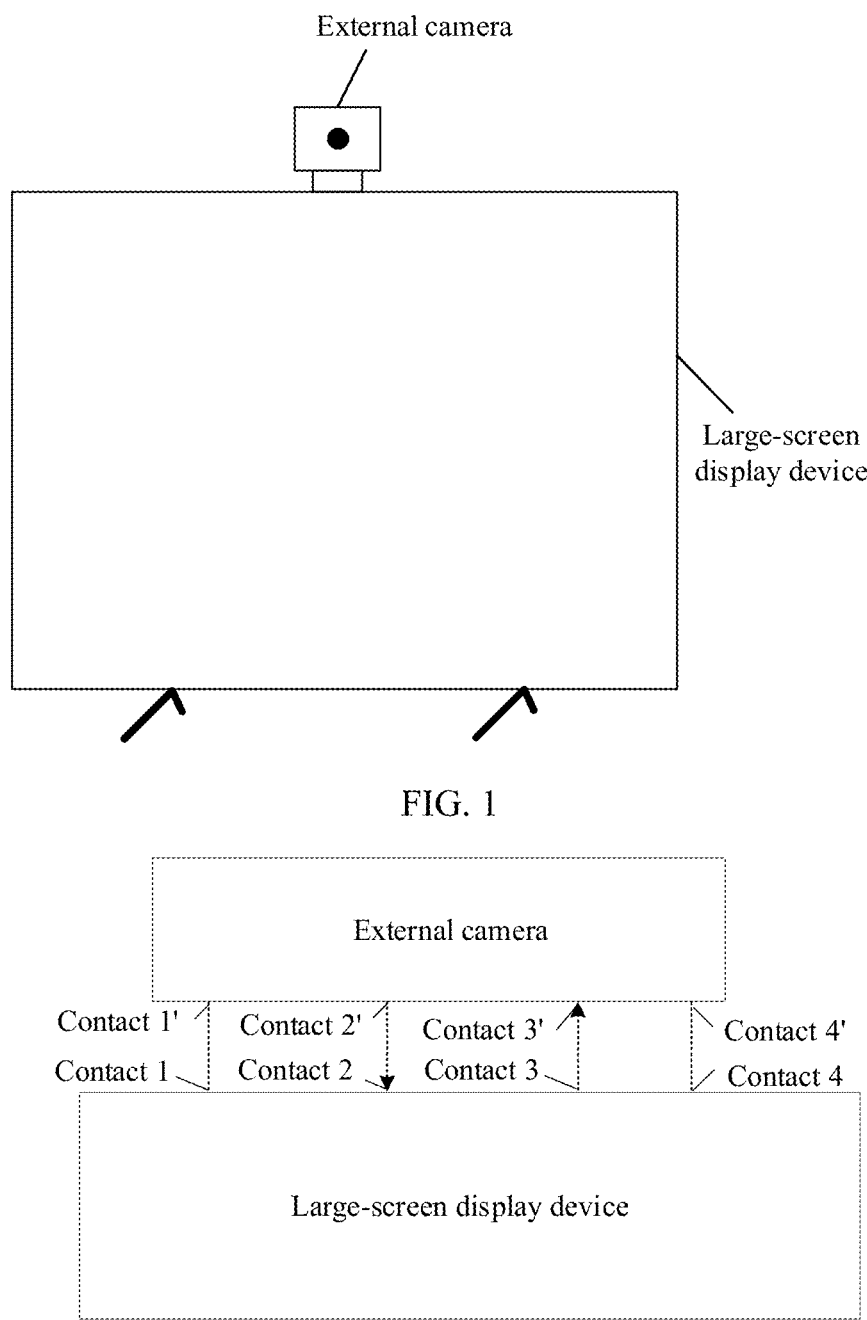
FIG. 1 is a schematic diagram of a status of an external connection between a second electronic device and a first electronic device according to an embodiment of this application.
FIG. 2 is a schematic diagram of an internal connection relationship between a second electronic device and a first electronic device according to an embodiment of this application.

FIG. 1 is a schematic diagram of a status of an external connection between the second electronic device and the first electronic device when the second electronic device is secured to the first electronic device by using a pogo pin, where the following is used as an example in FIG. 1: The first electronic device is a large-screen display device, and the second electronic device is a camera. Because the second electronic device is independent of the first electronic device in this embodiment of this application, when the second electronic device is the camera, the second electronic device may be referred to as an external camera. In a case that the external camera does not need to be used, a user generally removes the external camera from the large-screen display device, to protect privacy. At this time, the external camera is separated from the large-screen display device. When the user needs to use a camera function on the large-screen display device again, the user needs to secure the external camera to the large-screen display device again.

FIG. 2 is a schematic diagram of an internal connection relationship between an external camera and a large-screen display device when a user secures the external camera to the large-screen display device by using a pogo pin. It can be seen that there are four pairs of contacts between the external camera and the large-screen display device. The four contacts distributed on the large-screen display device are denoted as a contact 1, a contact 2, a contact 3, and a contact 4. The four contacts distributed on the external camera are denoted as a contact 1', a contact 2', a contact 3', and a contact 4'.

When the external camera is secured to the large-screen display device by using the pogo pin, each of the four pairs of contacts contact each other. In this case, a universal serial bus (USB) connection is completed between the external camera and the large-screen display device. The large-screen display device may supply, through a USB interface, power to the external camera that does not have an autonomous power supply capability. The external camera starts to be enabled only after being supplied with the power. After the external camera is completely enabled, information may also be transmitted between the large-screen display device and the external camera through the USB interface.

When the external camera and the large-screen display device are separated from each other, if an application on another electronic device sends a video call request to an application on the large-screen display device, that is, if an application on another electronic device sends a video call request to an application on an electronic device that is configured with no camera, the video call request can be established only after an electronic device that can provide a camera function is completely enabled.

However, it can be learned from the foregoing description that the external camera starts to be enabled only after being supplied with the power. It usually takes about several seconds to enable the external camera. The video call request cannot be established in this period. As a result, waiting time of users in a video call is prolonged, affecting user experience.

In view of this, an embodiment of this application provides a method for establishing a video call task, to shorten waiting time of users and improve user experience.

Figure 3:
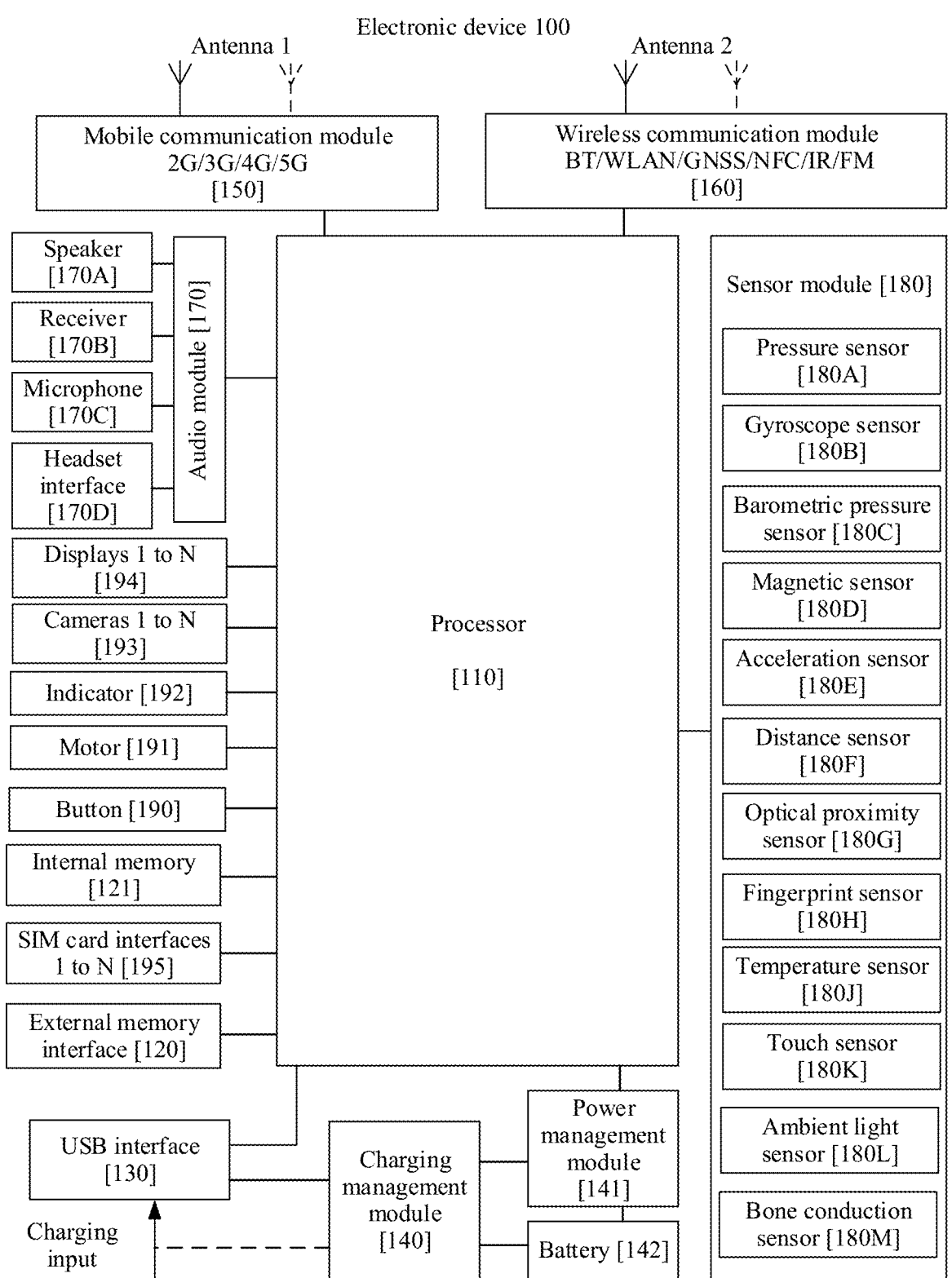
FIG. 3 is a schematic block diagram of an electronic device 100 according to an embodiment of this application.

Before description of this embodiment of this application, an electronic device provided in embodiments of this application is described first. For example, FIG. 3 is a schematic diagram of a structure of an electronic device 100 according to an embodiment of this application. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset interface 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on an instruction operation code and a time sequence signal, to complete control of instruction reading and instruction execution.

The processor 110 may be further provided with a memory, configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface conforming to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset to play audio through the headset. The interface may be further configured to connect to another electronic device, for example, an AR device.

It may be understood that an interface connection relationship, between modules, illustrated in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide solutions for wireless communications such as 2G, 3G, 4G, and 5G which are applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert, through the antenna 1, an amplified signal into an electromagnetic wave for radiation. In some embodiments, at least some functional modules of the mobile communication module 150 may be disposed in the processor 110. In some embodiments, at least some functional modules of the mobile communication module 150 may be disposed in the same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in the same device as the mobile communication module 150 or another functional module.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication camera module. The wireless communication module 160 receives an electromagnetic wave through the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the signal, and convert, through the antenna 2, a frequency-modulated and amplified signal into an electromagnetic wave for radiation.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, IR, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function by using the GPU, the display 194, the application processor, and the like. The GPU is a microprocessor for image processing, and is connected to the display 194 and the application processor. The GPU is configured to perform mathematical and geometric computation for graphics rendering. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more types of video codecs. In this way, the electronic device 100 can play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device

100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as a music file and a video file are stored in the external memory card.

The internal memory 121 may be configured to store computer-executable program code. The computer-executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, and may further include a non-volatile memory, for example, at least one magnetic disk storage device, a flash memory, or a universal flash storage (UFS). The processor 110 runs the instructions stored in the internal memory 121 and/or the instructions stored in the memory disposed in the processor, to perform various function applications and data processing of the electronic device 100.

The electronic device 100 may use the audio module 170, the speaker 170A, the receiver 170B, the microphone 170C, the headset interface 170D, the application processor, and the like to implement an audio function, for example, music playing and recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 may be disposed in the processor 110.

The speaker 170A, also referred to as a "loudspeaker", is configured to convert an audio electrical signal into a sound signal. The electronic device 100 may be used to listen to music or answer a hands-free call through the speaker 170A.

The receiver 170B, also referred to as an "earpiece", is configured to convert an electrical audio signal into a sound signal. When a call is answered or voice information is received through the electronic device 100, the receiver 170B may be put close to a human ear for listening to a voice.

The microphone 170C, also referred to as a "mike" or a "mic", is configured to convert a sound signal into an electrical signal. When making a call or sending a voice message, a user may make a sound with the microphone 170C close to his/her mouth, to input a sound signal to the microphone 170C. The electronic device 100 may be provided with at least one microphone 170C. In some other embodiments, the electronic device 100 may be provided with two microphones 170C, to implement a noise reduction function, in addition to collecting the sound signal. In some other embodiments, the electronic device 100 may alternatively be provided with three, four, or more microphones

170C, to collect a sound signal, implement noise reduction, identify a sound source, implement a directional recording function, and the like.

The headset interface 170D is configured to connect to a wired headset. The headset interface 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates having conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may further calculate a touch position based on a detection signal of the pressure sensor 180A. In some embodiments, touch operations that are performed at a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyroscope sensor 180B may be configured to determine a motion gesture of the electronic device 100. In some embodiments, angular velocities of the electronic device 100 around three axes (namely, axes x, y, and z) may be determined by using the gyroscope sensor 180B. The gyroscope sensor 180B may be configured to implement image stabilization during photographing. For example, when the shutter is opened, the gyroscope sensor 180B detects a shaking angle of the electronic device 100, and calculates, based on the angle, a distance for which a lens module needs to compensate, so as to cancel shaking of the electronic device 100 through reverse motion of the lens, thereby implementing image stabilization. The gyroscope sensor 180B may also be used in a navigation scenario and a somatic game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flap/leather case by using the magnetic sensor 180D. In some embodiments, when the electronic device 100 is a clamshell phone, the electronic device 100 may detect opening and closing of a flap by using the magnetic sensor 180D. Further, a feature such as automatic unlocking upon uncovering is set based on a detected opening or closing state of a leather case or a flap.

The acceleration sensor 180E may detect accelerations of the electronic device 100 in various directions (generally along three axes), may detect a magnitude and a direction of gravity when the electronic device 100 is static, and may be further configured to recognize a posture of the electronic device, thereby being used in applications such as screen switching between a landscape mode and a portrait mode, and a pedometer.

The distance sensor 180F is configured to measure a distance. The electronic device 100 may measure the distance in an infrared manner or a laser manner. In some embodiments, the electronic device 100 may measure a distance in a photographing scenario by using the distance sensor 180F, to implement quick focusing.

For example, the optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may be further configured to automatically adjust white balance during photographing. The ambient light sensor 180L may further cooperate with the optical proximity sensor 180G in detecting whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption for thermal protection. In some other embodiments, when the temperature is less than another threshold, the electronic device 100 heats the battery 142 to avoid abnormal shutdown of the electronic device 100 caused by a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch component". The touch sensor 180K may be disposed on the display 194. The touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in the headset, to constitute a bone conduction headset. The audio module 170 may obtain a voice signal by parsing the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button or a touch button. The electronic device 100 may receive a button input, and generate a button signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playback) may correspond to different vibration feedback effects. For touch operations performed on different areas of the display 194, the motor 191 may further produce different vibration feedback effects correspondingly. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or withdrawn from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or of different types. The SIM card interface 195 is compatible with different types of SIM cards. The SIM card interface 195 is also compatible with an external memory card. The electronic device 100 interacts with a network through the SIM card, to implement functions such as making/answering a call and data communication. In some embodiments, the electronic device 100 uses an eSIM, namely, an embedded SIM card. The eSIM card may be embedded in the electronic device 100, and cannot be separated from the electronic device 100. It should be understood that, except the components or modules listed in FIG. 3, a structure of the electronic device 100 is not specifically limited in this embodiment of this application. In some other embodiments of this application, the electronic device 100 may further include more or fewer components than those shown in the figure, or some components may be combined, or some components may be split, or different component arrangements may be used. The components shown in the figure may be implemented by using hardware, software, or a combination of software and hardware.

A software system of the electronic device 100 may use a layered architecture, an event-driven architecture, a microkernel architecture, a micro service architecture, or a cloud architecture. In an embodiment of this application, an Android system of a layered architecture is used as an example to illustrate a software structure of the electronic device 100.

Figure 4:
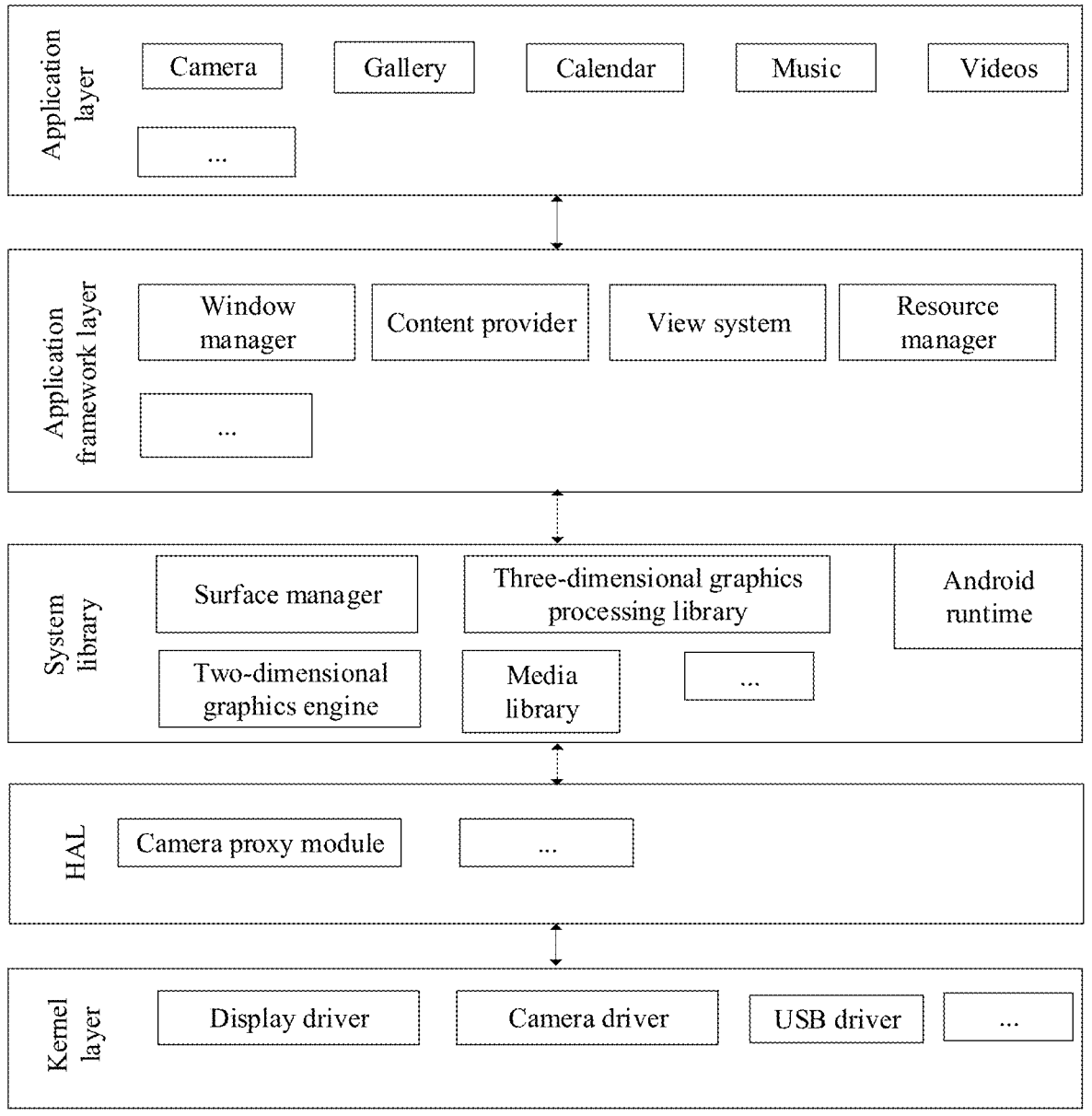
FIG. 4 is a block diagram of a software structure of an electronic device 100 according to an embodiment of this application.
Figure 5A:
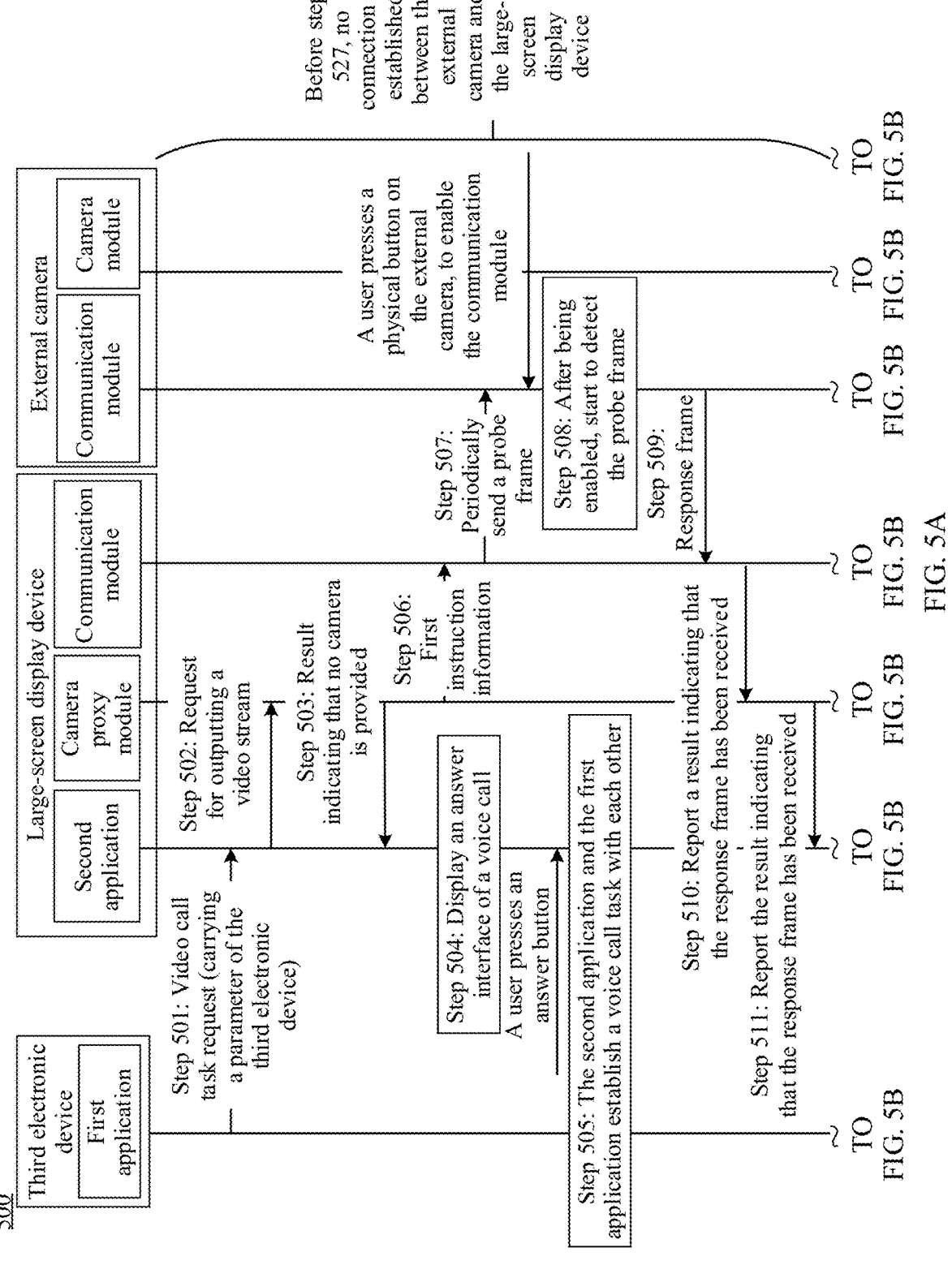
FIG. 5A to FIG. 5D are a schematic diagram of a method for establishing a video call task according to an embodiment of this application.
Figure 5B:
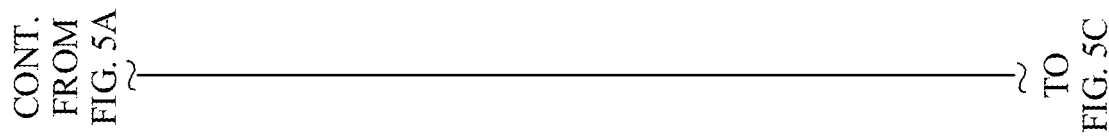
Figure 5C:
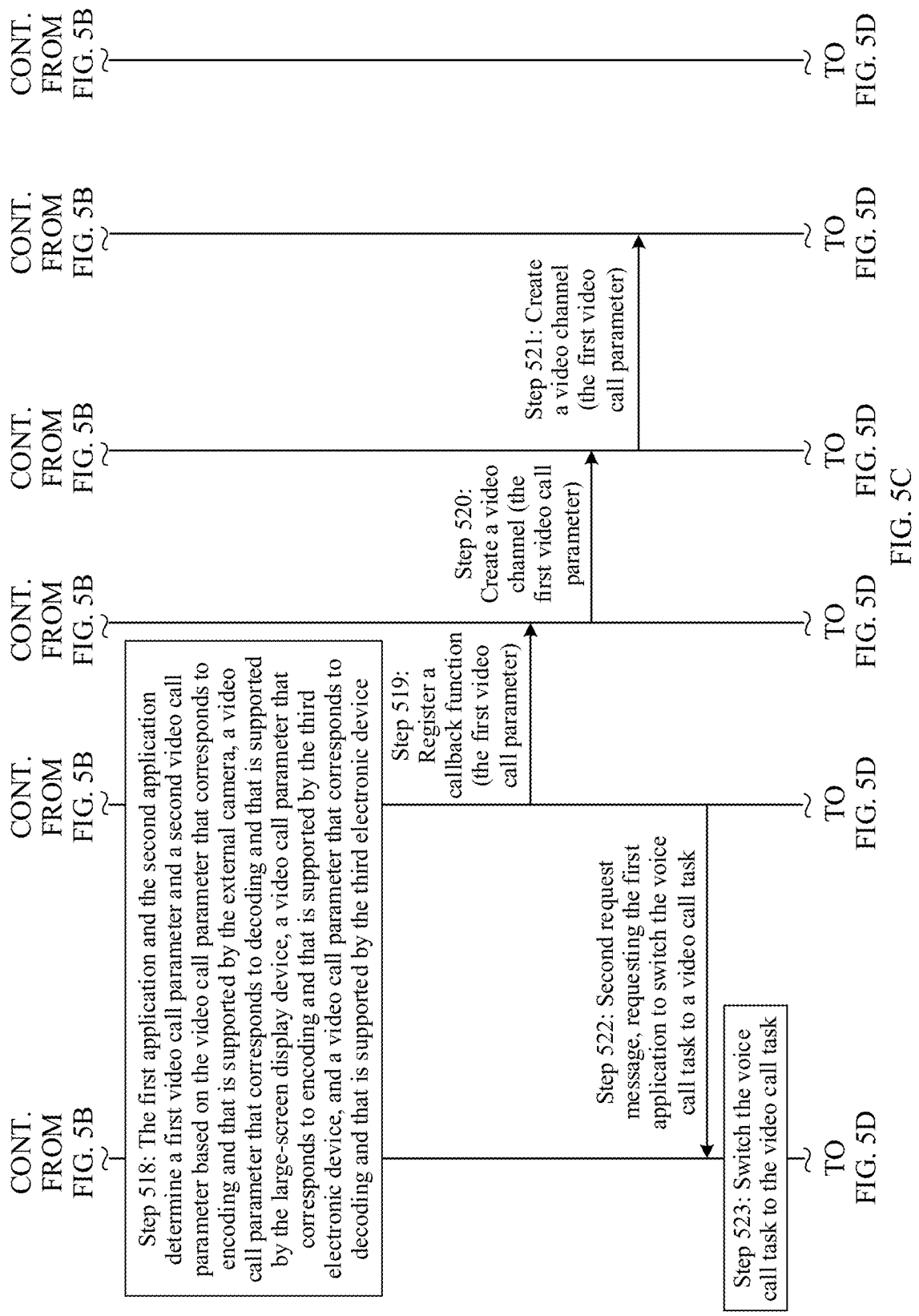
Figure 5D:
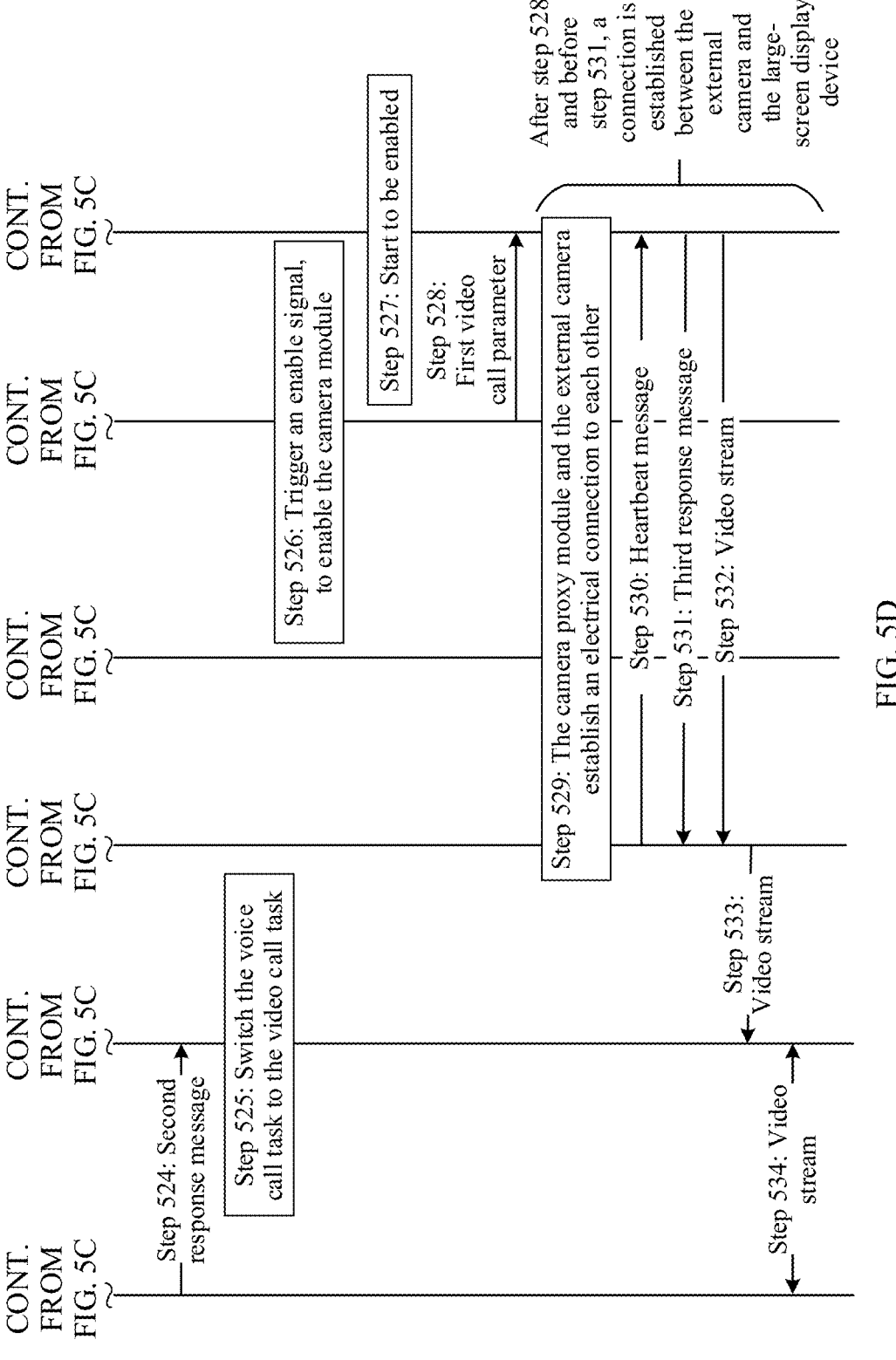

FIG. 4 is a block diagram of a software structure of an example electronic device 100 according to an embodiment of this application. In a layered architecture, software is divided into several layers, and each layer has a clear role and responsibility. The layers communicate with each other through a software interface. In some embodiments, the Android system is divided into four layers: an application layer, an application framework layer, an Android runtime and a system library, a hardware abstraction layer (HAL), and a kernel layer from top to bottom.

The application layer may include a series of application packages. As shown in FIG. 3, the application packages may include applications (APPs) such as Camera, Gallery, Calendar, Music, Videos, and Phone.

The application framework layer provides an application programming interface (API) and a programming framework for an application at the application layer. The application framework layer includes some predefined functions.

As shown in FIG. 4, the application framework layer may include a window manager, a content provider, a view system, a resource manager, and the like.

The window manager is configured to manage a window program. The window manager may obtain a size of the display, determine whether there is a status bar, lock a screen, take a screenshot, and the like.

The content provider is configured to store and obtain data, and enable the data to be accessible to an application. The data may include a video, an image, audio, and the like.

The view system includes visual controls such as a control for displaying a text and a control for displaying an image. The view system may be configured to construct an application. A display interface may include one or more views.

The resource manager provides, for an application, various resources such as a localized character string, an icon, a picture, a layout file, and a video file.

The Android runtime includes a kernel library and a virtual machine. The Android runtime is responsible for scheduling and managing the Android system.

The kernel library includes two parts: a function that needs to be invoked in the Java language, and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library, and a two-dimensional graphics engine.

The surface manager is configured to manage a display subsystem, and provide fusion of two-dimensional and three-dimensional graphics layers for a plurality of applications.

The media library supports playback and recording in a plurality of common audio and video formats, a static image file, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The two-dimensional graphics engine is a drawing engine for two-dimensional drawing.

The HAL may include a camera proxy module. In this embodiment of this application, for a function of the camera proxy module, refer to specific description in a camera connection method provided in this embodiment of this application.

The kernel layer is a layer between hardware and software. The kernel layer may include, for example, a display driver.

In this embodiment of this application, the electronic device 100 may be the first electronic device.

An example in which the first electronic device is a large-screen display device and the second electronic device is an external camera is used below to describe, with reference to FIG. 5A to FIG. 5D, a method 500 provided in an embodiment of this application. FIG. 5A to FIG. 5D are a schematic flowchart of interaction of the method 500.

Step 501: A first application sends a video call task request to a second application.

Specifically, when a user 1 wants to make a video call to a user 2, the user 1 initiates the video call to a video call APP on a large-screen display device of the user 2 by using a video call APP on an electronic device of the user 1. For ease of differentiation, the electronic device of the user 1 is denoted as a third electronic device; the video call APP on the third electronic device is denoted as a video call APP1; and the video call APP on the large-screen display device is denoted as a video call APP2. When the user 1 initiates the video call to the video call APP2 by using the video call APP1, the video call APP1 sends the video call task request to the video call APP2. The video call APP1 corresponds to the first application, and the video call APP2 corresponds to the second application.

Step 502: The second application sends, to a camera proxy module in the large-screen display device, a request for outputting a video stream.

Specifically, upon receiving the video call task request from the video call APP1, the video call APP2 may send, to the camera proxy module in the large-screen display device, the request for outputting the video stream.

Step 503: The camera proxy module reports, to the second application, a result indicating that the large-screen display device is configured with no camera.

Specifically, after receiving the request for outputting the video stream, the camera proxy module may determine whether the large-screen display device is currently configured with a camera. For example, the camera proxy module may check whether a file handle corresponding to a camera exists in the large-screen display device. It is worth mentioning that, a file handle corresponding to a camera is generated in the large-screen display device only when the large-screen display device has the camera. Because the large-screen display device is configured with no camera at this time, the camera proxy module cannot access a file handle corresponding to a camera in the large-screen display device. In this case, the camera proxy module may consider that the large-screen display device is configured with no camera, and report, to the video call APP2, a result indicating that the large-screen display device is configured with no camera.

Step 504: The second application displays an answer interface of a voice call.

Figure 6:
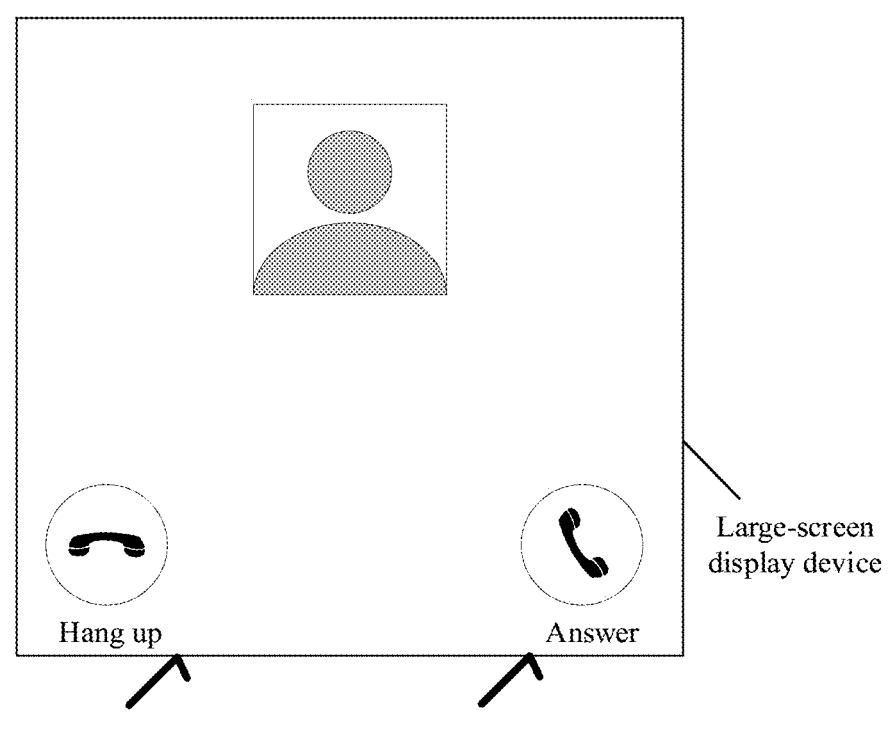
FIG. 6 is a schematic diagram of an answer interface of a voice call displayed by a first electronic device according to an embodiment of this application.

Specifically, upon learning that the large-screen display device currently does not have a camera function, the video call APP2 may display, on the large-screen display device, an answer interface of a voice call shown in FIG. 6.

Step 505: The second application and the first application establish a voice call task with each other.

Specifically, if the video call APP2 detects that the user 2 performs an operation (for example, an example of a first operation) of pressing an answer button on the answer interface of the voice call shown in FIG. 6, the video call APP2 establishes the voice call task with the video call APP1, and an audio stream may be transmitted between the video call APP1 and the video call APP2 by using the voice call task. In this case, the voice call may be made and answered by the user 1 and the user 2.

Step 506: The camera proxy module sends first instruction information to a communication module in the large-screen display device, where the first instruction information is used to instruct the communication module in the large-screen display device to send a probe frame in a short-distance mode.

Specifically, upon learning that the large-screen display device is currently configured with no camera, the camera proxy module may trigger the communication module to search for a surrounding electronic device that can provide a camera function. For example, the camera proxy module may send the first instruction information to the communication module, where the first instruction information is used to instruct the communication module in the large-screen display device to send the probe frame in the short-distance mode, and the probe frame is used to search for another electronic device that can provide the camera function for the large-screen display device.

Step 507: The communication module in the large-screen display device periodically sends the probe frame in the short-distance mode.

Specifically, the communication module in the large-screen display device periodically sends the probe frame in the short-distance mode. For example, the communication module in the large-screen display device sends a publish frame in the short-distance mode.

A definition of the short-distance mode is as follows: When the communication module sends the probe frame in the short-distance mode, a device within a circle that has a relatively small radius and that takes the large-screen display device as a circle center can detect the probe frame. For example, when the communication module sends the probe frame in the short-distance mode, a device within a circle that has a radius of 50 cm and that takes the large-screen display device as the circle center can detect the probe frame.

Step 508: After being enabled, a communication module in the external camera starts to detect the probe frame.

Specifically, because the large-screen display device is currently configured with no camera, when needing to use a camera function on the large-screen display device, the user 2 needs to secure the external camera to the large-screen display device. For example, after seeing a video invitation, from the user 1, on the large-screen display device, the user 2 may secure the external camera to the large-screen display device by using a pogo pin. The external camera approaches the large-screen display device in a period from the user picking up the external camera to the user securing the external camera to the large-screen display device by using the pogo pin.

In a process in which the user moves the external camera towards the large-screen display device, the user may control a power supply module to supply power to the communication module in the external camera. Then, the communication module starts to detect the probe frame.

For example, an autonomous power supply module may be disposed in the external camera. For example, the autonomous power supply module may be a lithium battery, and the lithium battery may supply power to the communication module in the external camera. In addition, a physical button may be embedded in the external camera to control power supply of the lithium battery. When the physical button is not pressed, the lithium battery does not supply power to the communication module in the external camera. When the physical button is pressed, the lithium battery starts to supply power to the communication module in the external camera. It is worth mentioning that, the communication module in the external camera may have only a working capability in the short-distance mode. In other words, the communication module in the external camera may work always in the short-distance mode after being supplied with the power.

The user 2 may press the physical button on the external camera in a process of moving the external camera towards the large-screen display device. At this time, the communication module is supplied with the power. Then, the communication module starts to detect the probe frame.

Figure 7:
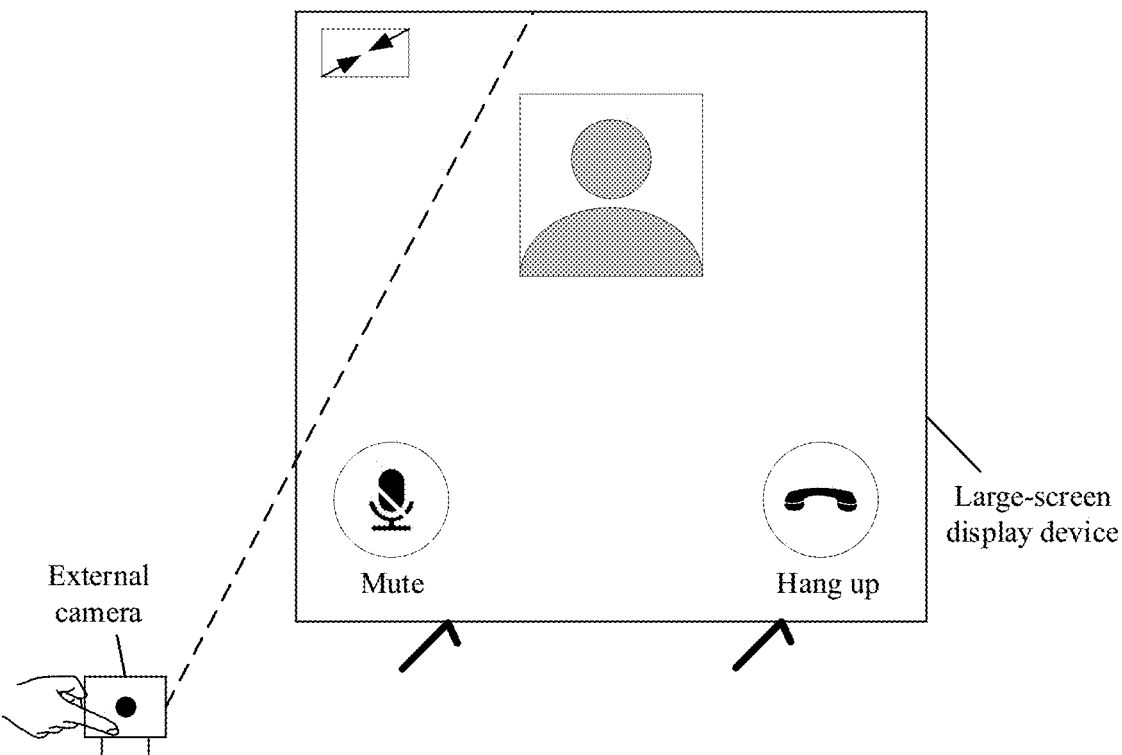
FIG. 7 is a schematic diagram of a state in which a second electronic device is approaching a first electronic device according to an embodiment of this application.

FIG. 7 is a schematic diagram of a state in which the external camera is approaching the large-screen display device. At this time, only the voice call task is established between the video call APP2 and the video call APP1. Therefore, at this time, the large-screen display device displays only a display interface of the voice call.

Step 509: After detecting the probe frame, the communication module in the external camera sends a response frame in the short-distance mode.

Specifically, when the communication module in the external camera detects the probe frame from the large-screen display device, the communication module in the external camera may send the response frame in the short-distance mode.

For example, in a process in which the external camera approaches the large-screen display device, the communication module in the external camera detects the probe frame at a position that is 30 cm away from the large-screen display device. In this case, the communication module in the external camera sends the response frame in the short-distance mode.

Step 510: The communication module in the large-screen display device reports, to the camera proxy module, a result indicating that the response frame has been received.

Specifically, after detecting the response frame from the external camera, the communication module in the large-screen display device may report the result to the camera proxy module. In this case, the camera proxy module may consider that there is a camera approaching the large-screen display device currently. In some embodiments, when the probe frame is a publish frame, a corresponding response frame is an identify frame.

In addition, when learning that the communication module in the large-screen display device has received the response frame, the camera proxy module in the large-screen display device may determine that the external camera has received the probe frame. In this case, the camera proxy module may instruct the communication module in the large-screen display device to stop sending the probe frame.

It should be noted that 30 cm is merely used as an example above for description, and does not constitute a limitation on this embodiment of this application. In specific implementation, all distances at which the communication module can detect the probe frame fall within the protection scope of this application.

Step 511: The camera proxy module reports, to the second application, the result indicating that the response frame has been received.

Specifically, after the camera proxy module learns that the communication module in the large-screen display device has received the response frame from the external camera, the camera proxy module may consider that there is a camera approaching the large-screen display device currently, and report the result to the video call APP2.

Step 512: After learning that the camera proxy module has received the response frame, the second application sends a first request message to the camera proxy module, where the first request message is used to request a video call parameter (for example, a parameter of the external camera) corresponding to encoding and supported by the external camera.

Specifically, when the video call APP2 learns that there is a camera approaching the large-screen display device, the video call APP2 may trigger the camera proxy module to obtain the video call parameter corresponding to encoding and supported by the external camera. For example, the video call APP2 may send the first request message to the camera proxy module, where the first request message is used to request the video call parameter corresponding to encoding and supported by the external camera. The video call parameter corresponding to encoding and supported by the external camera may include, for example, an encoding scheme, a bit rate, a resolution, and a frame rate that are supported by the external camera when encoding an original frame image.

Step 513: The camera proxy module sends the first request message to the communication module in the large-screen display device.

Step 514: The communication module in the large-screen display device sends, in the short-distance mode, the first request message to the communication module in the external camera.

Step 515: The communication module in the external camera sends, in the short-distance mode, a first response message to the communication module in the large-screen display device, where the first response message carries the video call parameter corresponding to encoding and supported by the external camera.

Specifically, after receiving the first request message in the short-distance mode, the communication module in the external camera may obtain the video call parameter corresponding to encoding and supported by the external camera, and send, in the short-distance mode to the communication module in the large-screen display device by using the first response message, the video call parameter corresponding to encoding and supported by the external camera.

Step 516: The communication module in the large-screen display device sends the first response message to the camera proxy module.

Step 517: The camera proxy module in the large-screen display device sends the first response message to the second application.

Step 518: Based on the video call parameter corresponding to encoding and supported by the external camera, a video call parameter corresponding to decoding and supported by the large-screen display device, a video call parameter corresponding to encoding and supported by the third electronic device, and a video call parameter (for example, a parameter of the third electronic device) corresponding to decoding and supported by the third electronic device, the second application and the first application determine a first video call parameter of the external camera and a second video call parameter of the third electronic device, and determine, based on the first video call parameter of the external camera and the second video call parameter of the third electronic device, a video call parameter that is actually used when an original frame image is encoded, where the first video call parameter of the external camera is a video call parameter that needs to be used when the external camera encodes the original frame image; and the second video call parameter of the third electronic device is a video call parameter that needs to be used when the third electronic device encodes the original frame image.

Specifically, for example, the video call parameter corresponding to decoding and supported by the third electronic device may include, for example, a decoding scheme, a bit rate, a resolution, and a frame rate that are supported by the third electronic device when decoding a video stream. Among the video call parameters corresponding to decoding and supported by the third electronic device, the decoding scheme, the bit rate, the frame rate, and the resolution that are supported by the third electronic device are H264, 10 megabits per second (Mbps), 30 frames per second (FPS), and 1280×720, respectively. Among the video call parameters corresponding to encoding and supported by the external camera, the encoding scheme, the bit rate, the frame rate, and the resolution that are supported by the external camera are H264 and H265, 10 Mbps, 60 FPS, and 1920×1080, respectively. Based on the video call parameter corresponding to decoding and supported by the third electronic device and the video call parameter corresponding to encoding and supported by the external camera, the video call APP2 determines that the first video call parameters of the external camera are as follows: The encoding scheme is H264, the bit rate is less than or equal to 10 Mbps, the frame rate is less than or equal to 30 FPS, and the resolution is less than or equal to 1280×720.

For example, the video call parameter corresponding to encoding and supported by the third electronic device may include, for example, an encoding scheme, a bit rate, a resolution, and a frame rate that are supported by the third electronic device when encoding the original frame image. Among the video call parameters corresponding to encoding and supported by the third electronic device, the encoding scheme, the bit rate, the frame rate, and the resolution that are supported by the third electronic device are H265, 10 Mbps, 60 FPS, and 1920×1080, respectively. The video call parameter corresponding to decoding and supported by the large-screen display device may include, for example, a decoding scheme, a bit rate, a resolution, and a frame rate that are supported by the large-screen display device when decoding the video stream. Among the video call parameters corresponding to decoding and supported by the large-screen display device, the decoding scheme, the bit rate, the frame rate, and the resolution that are supported by the large-screen display device are H264 and H265, 10 Mbps, 30 FPS, and 1280×720, respectively. Based on the video call parameter corresponding to encoding and supported by the third electronic device and the video call parameter corresponding to decoding supported by the large-screen display device, the video call APP1 determines that the second video call parameters of the third electronic device are as follows: The encoding scheme is H265, the bit rate is less than or equal to 10 Mbps, the frame rate is less than or equal to 30 FPS, and the resolution is less than or equal to 1280×720.

The video call parameter corresponding to decoding and supported by the third electronic device may be carried in the video call task request from the video call APP1. In other words, the video call APP2 may obtain, from the video call task request from the video call APP1, the video call parameter corresponding to decoding and supported by the third electronic device.

Step 519: The second application registers a callback function, and delivers the determined first video call parameter of the external camera to the camera proxy module.

Specifically, after determining the first video call parameter supported by the external camera, the video call APP2 may deliver the first video call parameter supported by the external camera to the camera proxy module. In addition, the video call APP2 registers the callback function. After receiving a video stream from the external camera, the camera proxy module sends the video stream to the second application based on the callback function.

Step 520: The camera proxy module creates a video channel (for example, a data transmission channel), and delivers the first video call parameter of the external camera to the communication module in the large-screen display device.

Step 521: The communication module in the large-screen display device creates a video channel, and delivers, in the short-distance mode, the first video call parameter of the external camera to the communication module in the external camera.

Specifically, the camera proxy module delivers the first video call parameter of the external camera to the communication module in the large-screen display device. The communication module in the large-screen display device delivers, in the short-distance mode, the first video call parameter of the external camera to the communication module in the external camera. The communication module in the external camera may store the first video call parameter of the external camera after receiving, in the short-distance mode, the first video call parameter of the external camera.

Step 522: The second application sends a second request message to the first application after negotiating the first video call parameter of the external camera with the first application, where the second request message requests the first application to switch the voice call to a video call.

Specifically, the video call APP2 may send the second request message to the video call APP1 after determining the first video call parameter of the external camera, where the second request message requests the first application to switch the voice call to the video call.

Step 523: The first application switches the voice call to the video call.

Specifically, the video call APP1 may switch the voice call to the video call after receiving the second request message.

It is worth mentioning that, switching from the voice call to the video call in this embodiment of this application may be understood as follows: The video call APP creates a canvas. The canvas has the following function: A video stream from a camera module in the external camera is rendered on the canvas when the video stream is received, so that a corresponding picture is displayed. For example, the video call APP1 creates the canvas based on the second video call parameter that is of the third electronic device and that is determined in step 517.

Step 524: The first application sends a second response message to the second application.

Specifically, the video call APP1 sends the second response message to the video call APP2 after switching the voice call to the video call, where the second response message indicates that the video call APP1 agrees to switch the voice call to the video call.

Step 525: The second application switches the voice call to the video call.

Specifically, the video call APP2 may switch the voice call to the video call after receiving the second response message. For example, the video call APP2 creates a canvas based on the first video call parameter that is of the external camera and that is determined in step 517.

Step 526: The communication module in the external camera triggers an enable signal, and triggers enabling of a camera module in the external camera by using the enable signal.

Specifically, after sending the response frame, the communication module in the external camera may trigger enabling of the camera module in the external camera by using the enable signal.

Figure 8:
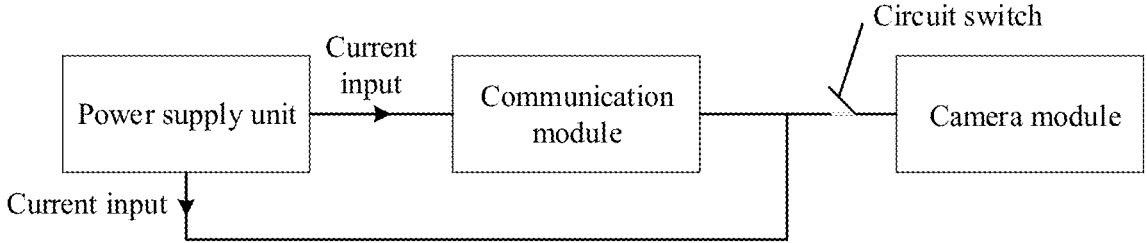
FIG. 8 is a schematic diagram of an example connection relationship among a power supply module, a communication module, and a camera module according to an embodiment of this application.

FIG. 8 is a schematic diagram of an example connection relationship among the power supply module in the external camera, the communication module, and the camera module when the power supply module supplies power to the external camera. After sending the response frame, the communication module may trigger, by using the enable signal, a switch between the power supply module and the camera module to be turned on. In this case, the camera module is powered on and enabled. In an embodiment, the enable signal may be implemented by using a general purpose input/output (GPIO) event.

Step 527: The camera module in the external camera starts to be enabled.

Step 528: The camera module in the external camera obtains the first video call parameter of the external camera.

Specifically, the camera module in the external camera may obtain, in an enable process, the first video call parameter that is of the external camera and that is stored above, so that the original frame image can be subsequently encoded based on the first video call parameter of the external camera, to generate the video stream.

Step 529: The camera proxy module in the large-screen display device and the external camera establish an electrical connection to each other.

A USB driver runs in the large-screen display device when the external camera is secured to the large-screen display device by using the pogo pin. After the USB driver finishes running, a USB connection is established between the external camera and the large-screen display device. If the USB connection has been established between the external camera and the large-screen display device, and the camera module in the external camera has been completely enabled, the electrical connection has been successfully established between the large-screen display device and the external camera.

Step 530: The camera proxy module sends a heartbeat message to the camera module in the external camera.

Specifically, after learning that the communication module in the large-screen display device has received the response frame, the camera proxy module may determine whether the external camera is successfully connected to the large-screen display device.

For example, the camera proxy module may detect, at a preset interval, whether the external camera is successfully connected to the large-screen display device. For example, the camera proxy module may send the heartbeat message to the camera module in the external camera at an interval of 30 milliseconds, where the heartbeat message is used to determine whether the external camera is successfully connected to the large-screen display device. If the camera module in the external camera receives the heartbeat message, the external camera has been successfully connected to the large-screen display device. It is worth mentioning that, after the large-screen display device is powered on, the camera proxy module may send the heartbeat message always at the preset interval.

Figure 9:
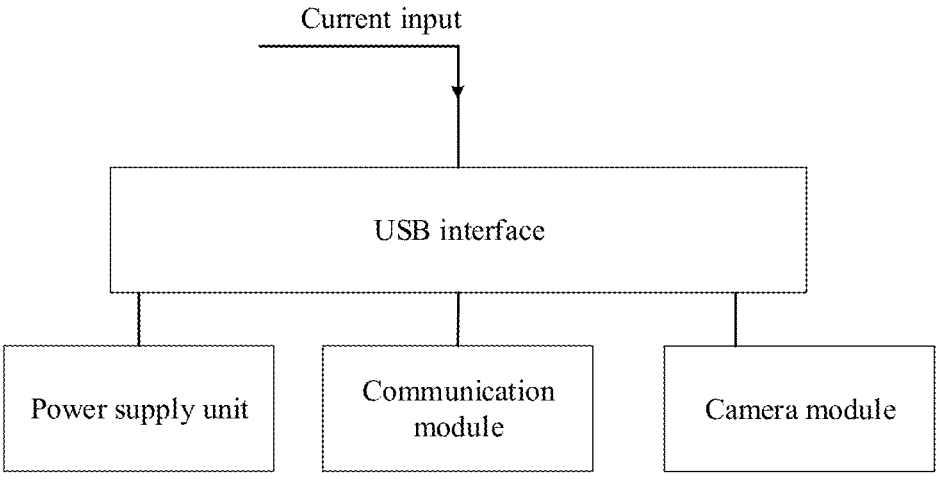
FIG. 9 is a schematic diagram of an example connection relationship among a USB interface, a power supply module, a communication module, and a camera module according to an embodiment of this application.

It is worth mentioning that, after the USB connection is established between the external camera and the large-screen display device, the large-screen display device may supply power to the external camera through a USB interface. In addition, the large-screen display device may charge the power supply module through the USB interface while supplying power to the external camera. FIG. 9 is a schematic diagram of an example connection relationship among the USB interface, the power supply module, the communication module, and the camera module when power is supplied to the power supply module and the external camera through the USB interface. It is worth mentioning that, when the power supply module is being charged, the power supply module may stop supplying power to the external camera.

Step 531: The camera module in the external camera returns a third response message to the camera proxy module.

Specifically, if the camera module in the external camera receives the heartbeat message, the external camera may consider that the external camera has been successfully connected to the large-screen display device. In this case, the camera module in the external camera may send the third response message to the camera proxy module, where the third response message is used to notify the camera proxy module that the external camera has been successfully connected to the large-screen display device.

In addition, after receiving the response frame from the external camera, the camera proxy module may further consider, after a preset time period, for example, 10 milliseconds, that the external camera has been successfully connected to the large-screen display device.

After learning that the external camera has been successfully connected to the large-screen display device, the camera proxy module may wait to receive the video stream output by the large-screen display device.

It should be noted that the interval at which the camera proxy module detects whether the external camera is completely enabled is merely an example, and does not constitute a limitation on this embodiment of this application.

Step 532: The camera module in the external camera outputs the video stream to the camera proxy module.

Specifically, after learning that the external camera has been successfully connected to the large-screen display device, the camera module in the external camera may encode the original frame image based on the obtained first video call parameter of the external camera to generate the video stream, and output the video stream to the camera proxy module.

Step 533: The camera proxy module of the large-screen display device outputs the video stream to the second application.

Specifically, the camera proxy module outputs the video stream to the second application based on the callback function.

Step 534: The second application outputs the video stream to the first application, and the first application correspondingly outputs a video stream to the second application, where the video stream from the first application is generated after the third electronic device encodes the original frame image based on the second video call parameter that is of the third electronic device that is determined in step 517.

Specifically, after receiving the video stream from the camera module in the external camera, the camera proxy module may output the video stream to the video call APP2. The video call APP2 outputs the video stream to the video call APP1. The video call APP2 and the video call APP1 separately decode the video stream to obtain the original frame image, and separately render an original frame on the canvases, so that corresponding images are displayed on the large-screen display device and the third electronic device.

Figure 10:
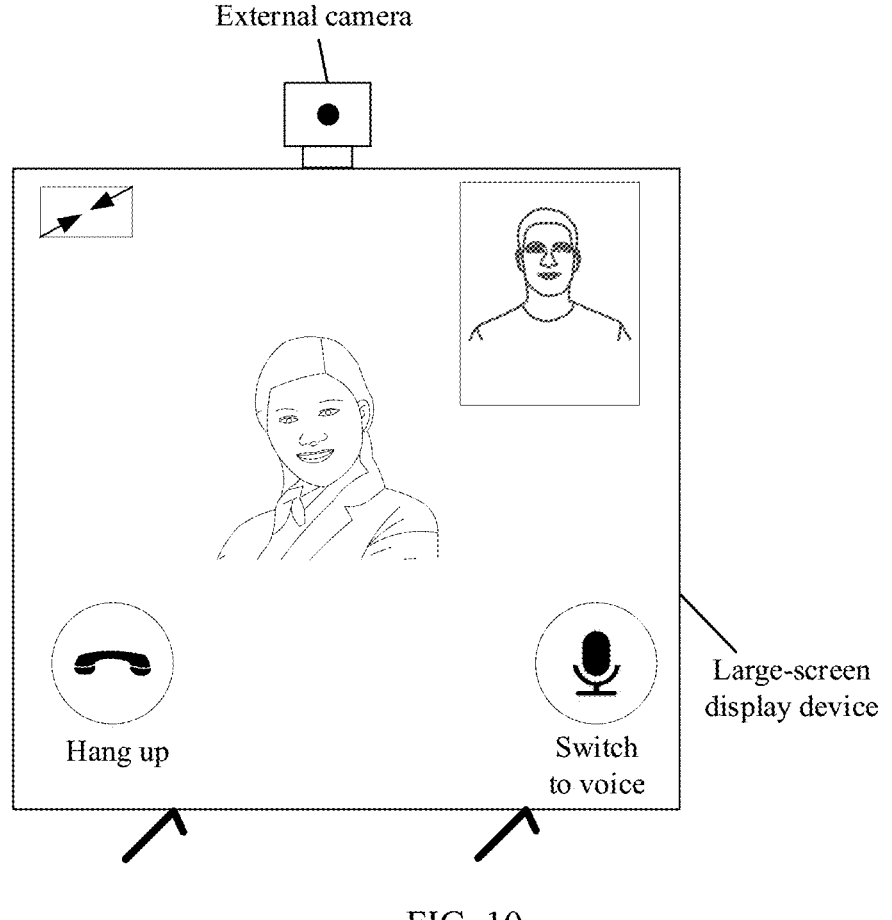
FIG. 10 is a display interface of a first electronic device after a second application renders a video stream according to an embodiment of this application.

Correspondingly, the video call APP1 also sends a video stream to the video call APP2. The video stream from the video call APP1 is generated after the third electronic device encodes the original frame image according to the second video call parameter that is of the third electronic device and that is determined in step 517. The video call APP1 outputs the video stream to the video call APP2. The video call APP2 and the video call APP1 separately decode the video stream to obtain the original frame image, and separately render the original frame on the canvases, so that corresponding images are displayed on the large-screen display device and the third electronic device. FIG. 10 shows a display interface of the large-screen display device after the video call APP2 renders the video stream. In this case, content displayed in a display region of the large-screen display device is obtained by the external camera and the large-screen display device.

It is worth mentioning that, in this embodiment of this application, step 518, step 521, and step 525 may be performed in parallel during specific implementation. This is not limited in this embodiment of this application.

During specific implementation, the communication module in this embodiment of this application may be a Bluetooth module or a wireless-fidelity (Wi-Fi) module.

It should be further understood that the foregoing descriptions are merely intended to help a person skilled in the art better understand embodiments of this application, but are not intended to limit the scope of embodiments of this application. Apparently, a person skilled in the art may make various equivalent modifications or changes based on the foregoing examples. For example, some steps in the foregoing method 500 may be unnecessary, or some steps may be added. Alternatively, any two or more of the foregoing embodiments are combined. A modified, changed, or combined solution also falls within the scope of the embodiments of this application.

It should be further understood that a value of a sequence number of each of the foregoing processes does not mean an order of an execution sequence. The execution sequence of each process should be determined based on a function and internal logic of each process, and should not be construed as any limitation on the implementation processes of embodiments of this application.

In this embodiment, the electronic device may be divided into functional modules based on the foregoing method example. For example, the functional modules may be divided for corresponding functions, or two or more functions may be integrated into one camera module. The integrated module may be implemented in a form of hardware. It should be noted that the module division in the embodiments is an example, and is merely logical function division; and there may be other division during actual implementation.

It should be noted that all related content of the steps in the foregoing method embodiments may be cited in function descriptions of corresponding functional modules. Details are not described herein again.

The electronic device provided in this embodiment is configured to perform the foregoing camera control method, and therefore can achieve the same effect as the foregoing implementation method. In a case that an integrated unit is used, the electronic device may include a camera module, a storage module, and a communication module. The camera module may be configured to control and manage actions of the electronic device, for example, may be configured to support the electronic device in performing steps performed by the processing units. The storage module may be configured to support the electronic device in storing program code, data, and the like. The communication module may be configured to support communications between the electronic device and another device.

The camera module may be a processor or a controller, and may implement or execute various example logical blocks, modules, and circuits described with reference to content disclosed in this application. The processor may alternatively be a combination for implementing a computing function, for example, a combination including one or more microprocessors or a combination of a digital signal processor (DSP) and a microprocessor. The storage module may be a memory. The communication module may be specifically a device, for example, a radio frequency circuit, a Bluetooth chip, or a Wi-Fi chip, that interacts with another electronic device.

In an embodiment, when the camera module is a processor and the storage module is a memory, the electronic device in this embodiment may be a device having the structure shown in FIG. 3.

An embodiment further provides a computer-readable storage medium. The computer-readable storage medium stores computer instructions. When the computer instructions are run on an electronic device, the electronic device is enabled to perform the foregoing related method steps, to implement the method in the foregoing embodiments.

An embodiment further provides a computer program product. When the computer program product runs on a computer, the computer is enabled to perform the related steps, to implement the method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions.

When the apparatus runs, the processor may execute the computer-executable instructions stored in the memory, to enable the chip to perform the methods in the foregoing method embodiments.

The electronic device, the computer storage medium, the computer program product, or the chip provided in the embodiments is configured to perform the corresponding method provided above. Therefore, for beneficial effects that can be achieved by the electronic device, the computer storage medium, the computer program product, or the chip, refer to the beneficial effects of the corresponding method provided above. Details are not described herein again.

Based on the foregoing descriptions of the implementations, a person skilled in the art may understand that for ease and brevity of description, only division of the foregoing function modules is used as an example for description. During actual application, the foregoing functions can be allocated, based on a requirement, to different functional modules for implementation, that is, an inner structure of the apparatus is divided into different functional modules to implement some or all of the functions described above.

In the several embodiments provided in this application, it should be understood that the disclosed apparatus and method may be implemented in other manners. For example, the described apparatus embodiments are merely examples. For example, division of the modules or units is merely logical function division; and there may be other division during actual implementation. For example, a plurality of units or components may be combined or may be integrated into another apparatus, or some features may be ignored or skipped. In addition, the displayed or discussed mutual couplings or direct couplings or communication connections may be implemented by using some interfaces. The indirect couplings or communication connections between the apparatuses or units may be implemented in electronic, mechanical, or other forms.

Units described as separate parts may or may not be physically separate. A component displayed as a unit may be one or more physical units, and may be located in one place, or may be distributed in a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing content is merely specific implementations of this application, and is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video call method, wherein the method is applied to a system comprising a first electronic device and an external camera, and the method comprises:

obtaining, by the first electronic device, a video call task request sent by a third electronic device;

detecting, by the first electronic device, that the first electronic device is currently configured with no camera;

establishing, by the first electronic device, a voice call task with the third electronic device;

sending, by the first electronic device, a probe frame to the external camera, wherein the external camera is in a state in which no connection is established to the first electronic device;

powering on a communication module in the external camera during which the external camera approaches the first electronic device;

obtaining, by the external camera, the probe frame;

sending, by the external camera, a response frame to the first electronic device in reply to the probe frame; and switching, by the first electronic device, the voice call task to a video call task, wherein the video call task is between the first electronic device and the third electronic device.

2. The method according to claim 1, wherein after obtaining the probe frame, the method further comprises:

starting to enable a camera module in the external camera.

3. The method according to claim 1 wherein the method further comprises:

establishing, by the external camera, an electrical connection to the first electronic device after the external camera is plugged into an interface of the first electronic device;

sending, by the external camera, a video stream to the first electronic device; and sending, by the first electronic device, the video stream to the third electronic device by using the video call task.

4. The method according to claim 1, wherein before switching the voice call task to the video call task, the method further comprises:

obtaining, by the first electronic device, a parameter of the external camera and a parameter of the third electronic device;

determining, by the first electronic device, a first video call parameter based on the parameter of the external camera and the parameter of the third electronic device;

sending, by the first electronic device, the first video call parameter to the external camera; and establishing, by the first electronic device, a data transmission channel with the external camera.

5. The method according to claim 4, wherein a parameter of the video stream is the first video call parameter of the external camera.

6. The method according to claim 4, wherein the obtaining the parameter of the external camera comprises:

sending, by the first electronic device, a first request message to the communication module in the external camera; and sending, by the communication module in the external camera, a first response message to the first electronic device, wherein the first response message carries the parameter of the external camera.

7. The method according to claim 2, wherein the starting to enable the camera module in the external camera comprises:

conducting, by the communication module in the external camera, a circuit between a power supply module in the external camera and the camera module in the external camera by using an enable signal; and starting to enable the camera module in the external camera.

8. The method according to claim 1, wherein before establishing the voice call task, the method further comprises:

displaying, by the first electronic device, an answer interface of a voice call; and wherein the establishing the voice call task comprises:

detecting, by the first electronic device, a first operation on the answer interface of the voice call, and establishing, by the first electronic device, the voice call task in response to the first operation.

9. The method according to claim 2, wherein before sending the video stream to the first electronic device, the method further comprises:

sending, by the first electronic device, a heartbeat message to the external camera; and sending, by the external camera, a third response message to the first electronic device, wherein the third response message indicates that the external camera has successfully established the electrical connection to the first electronic device.

10. A video call method, wherein the method is executed by an external camera, the external camera is in a state in which no connection is established to a first electronic device, and the method comprises:

powering on a communication module in the external camera during which the external camera approaches the first electronic device;

obtaining, by the external camera, a probe frame;

sending, by the external camera, a response frame to the first electronic device in reply to the probe frame;

establishing, by the external camera, an electrical connection to the first electronic device after the external camera is plugged into an interface of the first electronic device;

sending, by the external camera, a video stream to the first electronic device, wherein a parameter of the video stream is a first video call parameter of the external camera;

receiving, by the communication module in the external camera, a first request message sent by the first electronic device; and sending, by the communication module in the external camera, a first response message to the first electronic device, wherein the first response message carries the parameter of the external camera.

11. The method according to claim 10, wherein after obtaining the probe frame, the method further comprises:

starting to enable a camera module in the external camera.

12. The method according to claim 10, wherein the method further comprises:

receiving, by the external camera, the first video call parameter sent by the first electronic device.

13. The method according to claim 11, wherein the starting to enable the camera module in the external camera comprises:

conducting, by the communication module in the external camera, a circuit between a power supply module in the external camera and the camera module in the external camera by using an enable signal; and starting to enable the camera module in the external camera.

14. The method according to claim 10, wherein before sending the video stream to the first electronic device, the method further comprises:

receiving, by the external camera, a heartbeat message sent by the first electronic device; and sending, by the external camera, a third response message to the first electronic device, wherein the third response message indicates that the external camera has successfully established the electrical connection to the first electronic device.

15. An electronic device, comprising:

one or more processors, a memory, and one or more programs, wherein the one or more programs are stored in the memory, and upon execution by the processor, the one or more programs cause the electronic device to perform a connection establishment method including:

powering on a communication module in an external camera during which the external camera approaches a first electronic device;

obtaining, by the external camera, a probe frame;

sending, by the external camera, a response frame to the first electronic device in reply to the probe frame;

establishing, by the external camera, an electrical connection to the first electronic device after the external camera is plugged into an interface of the first electronic device;

sending, by the external camera, a video stream to the first electronic device, wherein a parameter of the video stream is a first video call parameter of the external camera;

receiving, by the communication module in the external camera, a first request message sent by the first electronic device; and sending, by the communication module in the external camera, a first response message to the first electronic device, wherein the first response message carries the parameter of the external camera.

16. The electronic device according to claim 15, wherein after obtaining the probe frame, the method further comprises:

starting to enable a camera module in the external camera.

17. The electronic device according to claim 15, wherein the method further comprises:

receiving, by the external camera, the first video call parameter sent by the first electronic device.

18. The electronic device according to claim 16, wherein the starting to enable the camera module in the external camera comprises:

conducting, by the communication module in the external camera, a circuit between a power supply module in the external camera and the camera module in the external camera by using an enable signal; and starting to enable the camera module in the external camera.

19. The electronic device according to claim 15, wherein before sending the video stream to the first electronic device, the method further comprises:

receiving, by the external camera, a heartbeat message sent by the first electronic device; and sending, by the external camera, a third response message to the first electronic device, wherein the third response message indicates that the external camera has successfully established the electrical connection to the first electronic device.

20. The electronic device according to claim 15, wherein a data transmission channel is established by the first electronic device with the external camera.

* * * * *